United States Patent
Masso et al.

[11] Patent Number: 6,063,155
[45] Date of Patent: May 16, 2000

[54] FLUIDIZED BED PROCESS FOR THE PRODUCTION OF IRON CARBIDE

[75] Inventors: Emilio Quero Masso; David Carrasquero, both of Edo. Bolivar, Venezuela

[73] Assignee: Orinoco Iron, C.A., Caracas, Venezuela

[21] Appl. No.: 09/055,859

[22] Filed: Apr. 6, 1998

[51] Int. Cl.[7] .................. C21B 13/00; C21B 15/00
[52] U.S. Cl. ................ 75/446; 75/450; 75/452; 423/439
[58] Field of Search .............. 75/450, 451, 452, 75/343, 446; 423/439

[56] References Cited

U.S. PATENT DOCUMENTS

| | | | |
|---|---|---|---|
| Re. 32,247 | 9/1986 | Stephens | 75/446 |
| 4,060,414 | 11/1977 | Kaufman | 75/246 |
| 5,137,566 | 8/1992 | Stephens et al. | 75/507 |
| 5,733,357 | 3/1998 | Stephens et al. | 75/505 |
| 5,810,905 | 9/1998 | Shultz | 75/446 |
| 5,837,031 | 11/1998 | Miyashita et al. | 75/450 |
| 5,869,018 | 2/1999 | Stephens, Jr. | 423/439 |

OTHER PUBLICATIONS

Hager et al., PCT publication WO 92/02824, "Method for Controlling the Conversion of Iron–Containing Reactor Feed into Iron Carbide," Feb. 1992.

Primary Examiner—Prince Willis, Jr.
Assistant Examiner—Tima McGuthry-Banks
Attorney, Agent, or Firm—Bachman & LaPointe, P.C.

[57] ABSTRACT

A process for conversion of iron oxide to iron carbide, including the steps of: providing a fluidized bed reactor having a metallizing zone and a carburizing zone; feeding iron oxide to the reactor; feeding a reducing gas to the reactor so as to provide reduced iron in the metallizing zone; and feeding a carburizing gas to the carburizing zone so as to provide a final iron carbide product in the carburizing zone having between about 2.2% wt. and about 6.5 wt. % carbon and at least about 80% wt. iron.

22 Claims, 3 Drawing Sheets

FLUIDIZED BED PROCESS FOR THE PRODUCTION OF IRON CARBIDE

BACKGROUND OF THE INVENTION

The invention relates to a process for production of iron carbide and, more particularly, to a fluidized bed process for converting metal oxides containing iron into iron carbide.

Iron carbide has been found to be a very useful starting material in the production of steel. U.S. Pat. Nos. Re. 32247 and 5,137,566 to Stephens, Jr. et al. relate to processes for converting reactor feed to iron carbide and then to steel. Further, U.S. Pat. No. 5,387,274 to Dam, O., et al. relates to a low-pressure process using a single multi-zone reactor for converting iron oxide into iron carbide pellets.

The foregoing processes are important improvements in the industry. However, the need remains for further improvements for example for enhancing the transportability of iron carbide product and handling of same in steel shops.

It is therefore the primary object of the present invention to provide a process for converting iron oxides into iron carbide briquettes which are more easily transported and handled.

It is a further object of the present invention to provide a process for converting iron oxides into iron carbide briquettes which have acceptable density and breakdown index criteria.

It is a still further object of the present invention to provide a process wherein conversion from iron oxides to iron carbide is carried out in multiple fluidized bed reactors.

It is another object of the present invention to provide a process for conversion of iron oxides to iron carbide wherein the iron reduction step is carried out separately from gas reforming and carburizing reactions.

It is still another object of the present invention to provide a process for conversion of iron oxide to iron carbide wherein process conditions are carried out so as to provide iron carbide briquettes which have acceptable structural strength without requiring the addition of a separate binder material.

Other objects and advantages of the present invention will appear hereinbelow.

SUMMARY OF THE INVENTION

In accordance with the present invention, the foregoing objects and advantages are readily attained.

According to the invention, a process for conversion of iron oxide to iron carbide is provided, which process comprises the steps of: providing a fluidized bed reactor having a metallizing zone and a carburizing zone; feeding iron oxide to said reactor; feeding a reducing gas to said reactor so as to provide reduced iron in said metallizing zone; and feeding a carburizing gas to said carburizing zone so as to provide a final iron carbide product in said carburizing zone having between about 2.2% wt. and about 6.5 wt. % carbon and at least about 80% wt. iron.

In further accordance with the present invention, the process is carried out at a high pressure using excess methane in the final carburization step so as to provide a desired amount of ferrite oxide and metallic iron in the final iron carbide product which serves as a binder material during briquetting procedures so as to provide briquettes having acceptable structural strength and breakdown index criteria without requiring additional added binders.

BRIEF DESCRIPTION OF THE DRAWINGS

A detailed description of preferred embodiments of the present invention follows, with reference to the accompanying drawings, wherein.

DETAILED DESCRIPTION

In accordance with the present invention, a process is provided for converting oxide fines containing iron into iron carbide which is ideally suited for briquetting so as to provide iron carbide which is more readily transported and handled. The process in accordance with the present invention involves utilizing a multiple-fluidized bed arrangement operating at a high pressure wherein oxide fines are pre-heated, reduced or metallized, and carburized so as to provide iron carbide particles having a shell of iron oxide or metallized iron, preferably α-iron or ferrite, which advantageously serves as a binder during subsequent briquetting procedures so as to provide iron carbide briquettes having acceptable mechanical strength and breakdown index criteria.

Figure 1:
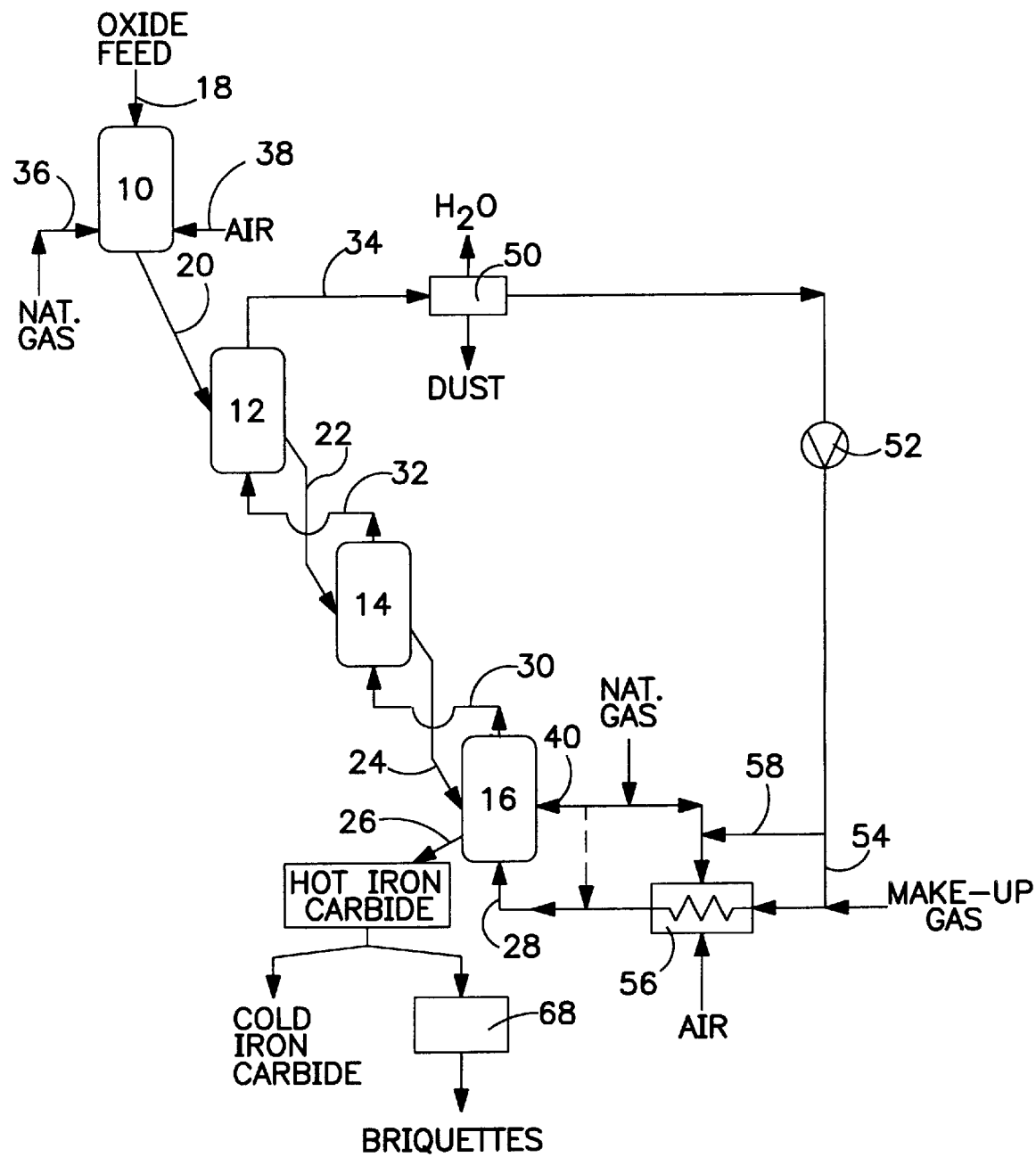
FIG. 1 schematically illustrates a multiple-fluidized bed reactor system for carrying out the process of the present invention.

Referring to FIG. 1, a system is schematically illustrated for carrying out the process in accordance with the present invention. As shown, a plurality of reactors are preferably provided, here reactors 10, 12, 14 and 16, and are provided in a serial arrangement whereby solid particulate material can be fed from reactor to reactor, preferably by gravity. In the embodiment as shown in FIG. 1, reactor 10 has an oxide inlet 18 and is connected to reactor 12 for flow by gravity by particulate matter through pipe 20. Similarly, reactor 14 is connected to reactor 12 for particulate flow by gravity through pipe 22, and reactor 16 is connected to reactor 14 for flow by gravity through pipe 24.

Oxide fines fed to reactor 10 and subsequently fed serially through reactors 12, 14 and 16 is treated as will be discussed below so as to provide a final iron carbide product from outlet 26 of reactor 16.

Material within reactors 10, 12, 14 and 16 is treated in accordance with the present invention with a reducing gas which is fed to the bottom reactor, reactor 16 in the embodiment of FIG. 1, through a gas inlet 28. Gas fed to reactor 16 migrates upwardly through reactor 16 and, from reactor 16, through gas line 30 to reactor 14. After passing through material in reactor 14, gas exits reactor 14 and travels to reactor 12 through gas line 32. In the embodiment of FIG. 1, top gas exiting reactor 12 via line 34 is treated to remove water and dust, and is mixed with reformed or make-up gas so as to provide the desired supply of reducing gas for feeding to gas inlet 28.

In the embodiment of FIG. 1, reactor 10 is operated as a pre-heating reactor, and oxide fines fed to reactor 10 are heated through the combustion of natural gas through inlet 36 in combination with pre-heated air introduced through inlet 38. Combustion of natural gas with air in reactor 10 is preferably carried out so as to provide oxide fines in reactor 10 at a temperature of between about 720° C. and about 840° C.

In accordance with the present invention, it has been found that by carrying out the reduction step separately from the carburizing and gas reforming reactions, competition for oxygen between the reduction and carburizing reactions can advantageously be avoided. In accordance with the present invention, and as illustrated in FIG. 1, a carburizing gas is preferably introduced into reactor 16 as shown by inlet 40, preferably at a point within the dense phase or highly metallized iron in the bed of reactor 16 as will be further discussed below.

It has been found that by feeding carburizing gas to the dense phase, iron carbide particles can be provided which have a shell of iron oxide or metallized iron, most preferably α-iron or ferrite, which shell serves as a binder during briquetting procedures so as to adhere iron carbide particles together to form briquettes of sufficient mechanical strength and having acceptable resistance to attrition.

Starting oxide fines material may suitably comprise a particulate iron oxide material having a particle size of up to about ⅜", and further characterized as follows: 11.5% to about 18.6%+16 mesh; between about 32.7% and about 36.83%, +100 mesh; and between about 40% and about 57.22, −100 mesh.

Reducing gas fed to inlet 28 preferably has a methane content of at least about 22% by vol., and more preferably has a dry basis composition by vol. of between about 58% and about 66% hydrogen, between about 5% and about 9% carbon monoxide, between about 1% and about 4% carbon dioxide, and between about 24% and about 33% methane, with nitrogen balance. The reducing gas is preferably fed to reactor 16 through inlet 28 at a temperature of between about 650° C. and about 850° C., more preferably at a temperature of between about 660° C. and about 760° C. The reducing gas fed to inlet 28 preferably has a ratio $(CH_4+CO)/CO_2$ of between about 9 and about 17, and has a reducing power $(H_2+CO)/(H_2O+CO_2)$ of between about 19 and about 34.

The preferred carburizing gas is methane, and may be provided from any source of natural gas and fed to gas inlet 40 preferably at a temperature of between about 598° C. and about 790° C. As indicated above, carburizing gas is preferably fed directly to the dense phase or highly metallized phase of material in final reactor 16.

Reactors, 10–16 in accordance with the present invention are preferably operated at a high pressure, for example up to about 30 bars, and more preferably at a pressure of between about 10.5 bars and about 12.5 bars.

Reactors 10–16 in accordance with the present invention preferably are operated so as to define a pre-heating zone or bed, preferably in reactor 10, a series of reducing zones or beds in reactors 12 and 14, and a reducing bed or zone as well as a carburizing bed or zone in final reactor 16. Thus, reduction prior to introduction to the carburizing zone is carried out in a series of reduction zone portions in accordance with the present invention. Thus, the reduction zone in reactor 12, for example, may be referred to as a pre-reducing zone or bed, and pre-reduced material exiting reactor 12 may preferably contain about 75% wt. iron and have a metallization degree of between about 2% and about 12%, while material exiting reactor 14 may suitably be further metallized or reduced so as to have a degree of metallization of between about 10% and about 78%, preferably about 75%.

Figure 2:
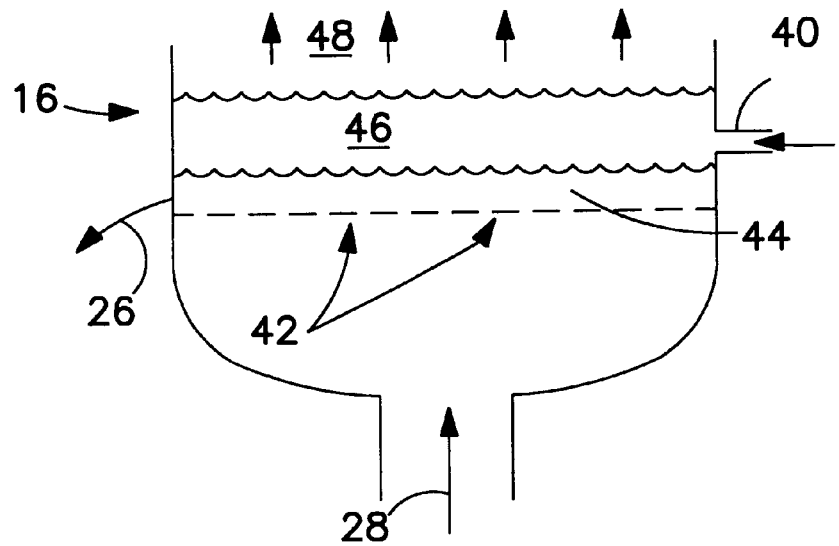
FIG. 2 illustrates a portion of the final reactor of the system of FIG. 1.

Referring to FIG. 2, a portion of final reactor 16 is shown including reducing gas inlet 28 and carburizing gas inlet 40. As shown, reducing gas passes through inlet 28 and through a series of gas distribution nozzles schematically represented at 42 to contact material within reactor 16. As shown, the flow of reducing gas through inlet 28 provides a zone 44 of material subject to the jet effect of gas passing through nozzles 42, a further zone 46 of dense phase or carburized material, and a zone 48 containing the last portion of material being reduced. As shown, inlet 40 for carburizing gas is preferably positioned so as to introduce carburizing gas directly into zone 46 containing the dense phase so as to take advantage of the combined catalytic effect of iron oxide, metallized iron and iron carbide in this area which has activity for enhancing massive carbon deposition. From reactor 16, a final carburized material is provided containing at least about 80% wt. iron, more preferably at least about 91% wt. iron, and between about 2.2% wt. and about 6.5% wt. carbon.

In further accordance with the present invention, it is preferred that reducing gas and carburizing gas be fed to reactor 16 in amounts sufficient to provide a ratio $(CH_4+CO)/CO_2$ of between about 9 and about 33. Further, gas is preferably fed to reactor 16 in amounts sufficient to provide a gas superficial velocity in reactors 10–16 of between about 3.2 ft/sec and about 4.5 ft/sec. This gas superficial velocity advantageously serves to provide for a quick removal of water vapor from the reactors as well as to provide a sufficient supply of hydrogen as the main reducing agent of the process. A faster superficial velocity also leads to a shorter residence time and, therefore, higher productivity of the process.

In further accordance with the present invention, and as mentioned above, top gas exiting reactor 12 through line 34 is preferably de-dusted and de-watered, for example in reactor 50. The de-watered and de-dusted gas is then preferably fed through a compressor 52 and may then suitably be split into two gas streams.

The first stream is mixed in line 54 with hot reducing make-up gas which may suitably be provided containing between about 86% and about 88% hydrogen, between about 4% and about 4.5% carbon monoxide, between about 0.5% and about 1.0% carbon dioxide, between about 4.5% and about 6% methane, between about 2% and about 3% water vapor, and nitrogen balance. This mixture of recycled top gas and reformed make-up gas is preferably heated, for example in heater 56, to provide reducing gas having the composition as described previously. This reducing gas, as shown in FIG. 1, is fed to inlet 28 of reactor 16.

The other portion or stream of top gas from compressor 52 may suitably be fed through line 58 to heater 56 as fuel for same. In this regard, top gas from line 58 may suitably be mixed with additional natural gas, which may come from a common source with natural gas fed to inlet 40, so as to provide suitable fuel for heater 56.

Figure 3:
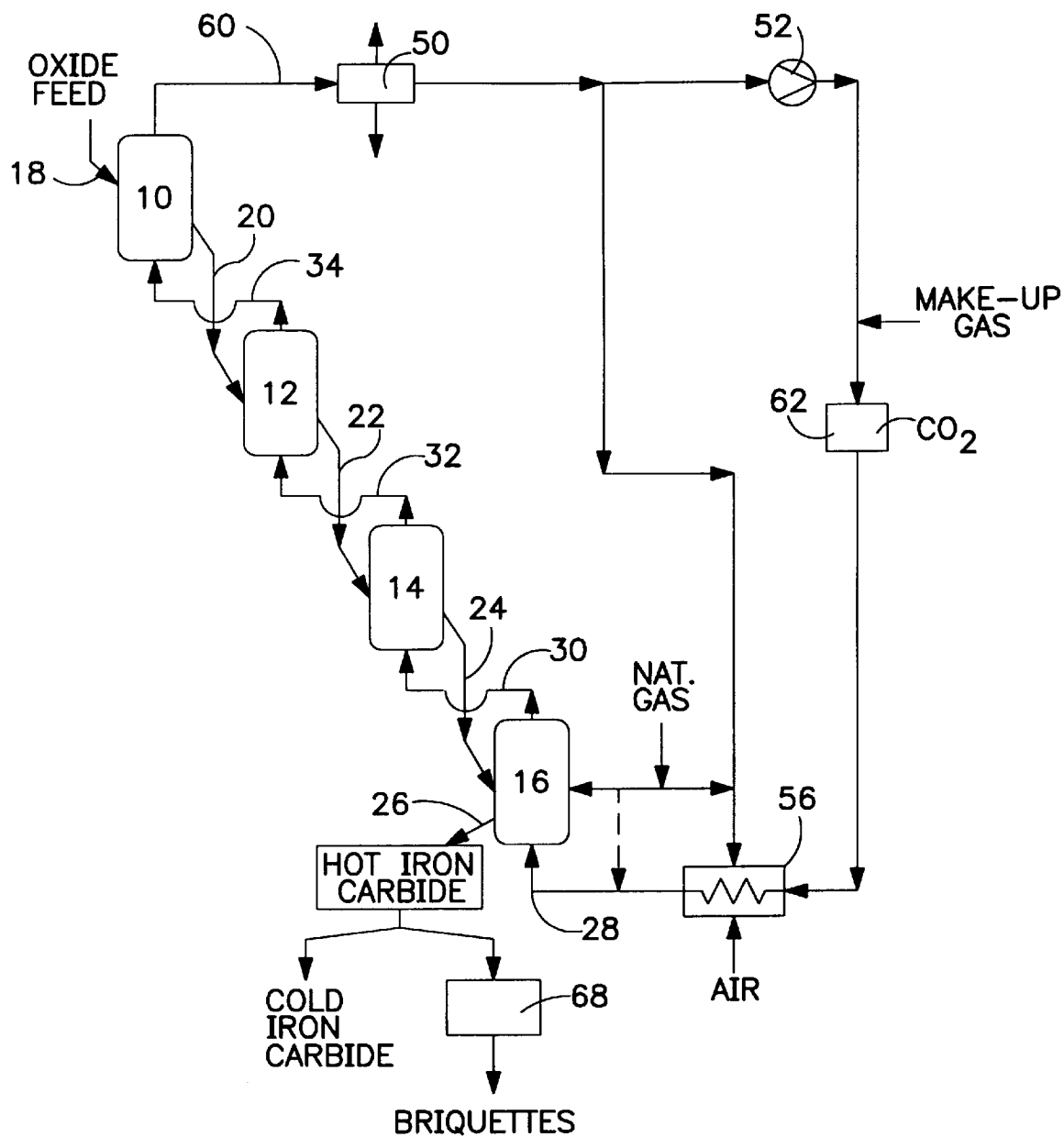
FIG. 3 schematically illustrates an alternative embodiment of a system for carrying out a process in accordance with the present invention.

FIG. 3 illustrates an alternative embodiment of a system for carrying out the process of the present invention. Similar to FIG. 1, this system includes reactor 10, 12, 14 and 16 arranged as discussed above for the flow of oxide material to be processed. In the embodiment of FIG. 3, however, top gas is removed from reactor 10, rather than reactor 12. Further in this embodiment, no combustion is carried out in reactor 10 so as to provide a pre-heating function. Pre-heated reactors may be provided upstream of reactor 10 if desired.

Further, gas recycled from reactor 10 along line 60 in this embodiment is fed to reactor 50 for removal of water and dust, and then split into two portions. The first portion in this embodiment is fed to compressor 52 and, subsequently, to reactor 62 for removing carbon dioxide. In this way, recycled top gas mixed with reforming gas can be manipulated so as to control the amount of carbon deposition in the final iron carbide product as desired in accordance with the present invention. The other portion of top gas in accordance with this embodiment of the present invention is preferably fed through line 66 and mixed with natural gas as desired so as to provide suitable fuel for heater 56 as desired. In all other respects, the system as illustrated in FIG. 3 operates in a similar manner to that illustrated in FIG. 1.

Figure 4:
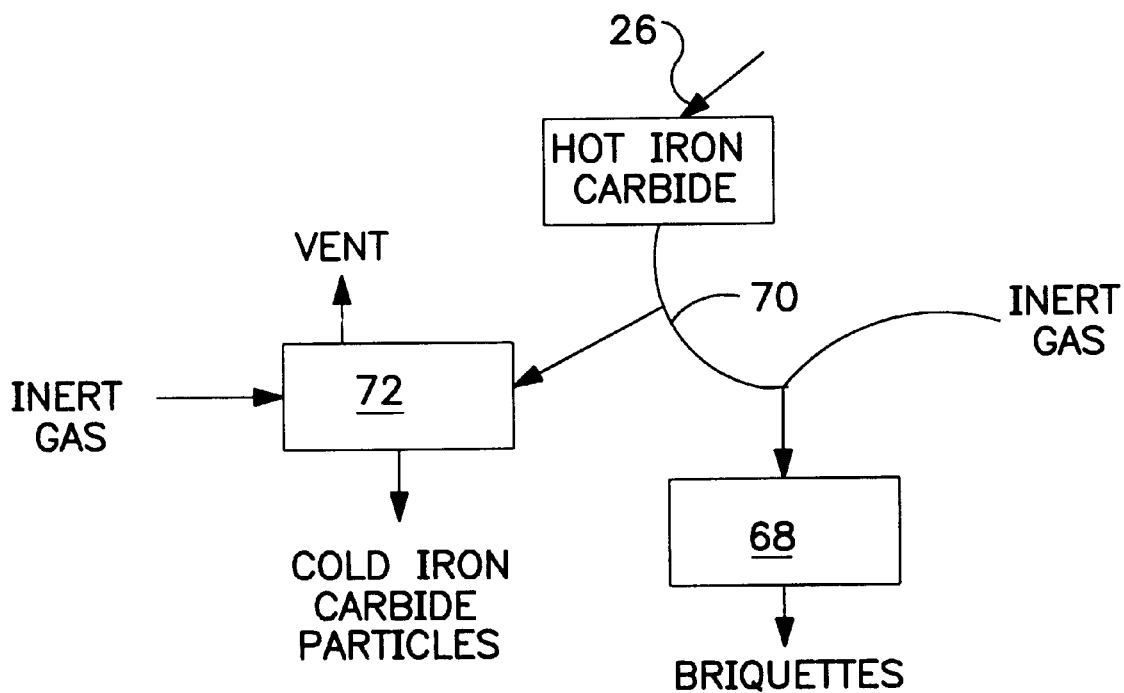
FIG. 4 schematically illustrates a further preferred embodiment in accordance with the present invention.

As set forth above, and referring to FIG. 4, iron carbide particles from outlet 26 of reactor 16 are preferably subjected to a flow of inert carrier gas which advantageously serves to allow for control of the amount or thickness of the shell of ferrite material on such particles. Suitable inert carrier gas may preferably have a composition by volume of between about 4% and about 12% carbon dioxide, with nitrogen balance. If it is desired to immediately transfer iron carbide particles to a hot briquetting procedure, inert gas may suitably be used as a carrier to carry such particles or pellets to a briquetting station 68, for example through line 70. Alternatively, and also as shown in FIG. 4, it may be preferred to cool the resulting iron carbide particles from outlet 26, and iron carbide particles may therefore be fed to cooling station 72 where they are exposed to a cooling flow of inert gas as describe above so as to provide cold high carbon iron carbide particles. These particles can, of course, be subjected to a briquetting step or procedure at a later time.

It should of course be appreciated that although schematical representations of systems for carrying out the process of the present invention are provided in FIGS. 1 and 3, the process of the present invention could of course be carried out on different systems well within the scope of the present invention.

Further, although this disclosure is presented in terms of a single pre-heat reactor 10 and two reducing reactors 12, 14 in FIG. 1, and three reducing reactors 10, 12, 14 in the embodiment of FIG. 3, it should of course be appreciated that more or less of each type of reactor could of course be used, also well within the scope of the present invention.

In accordance with the process of the present invention, iron carbide particles are prepared directly from oxide fines containing iron, and may, if desired, be passed directly to a briquetting step for forming iron carbide briquettes without additional binders or other materials. Briquettes so made have excellent mechanical strength and break-down index characteristics.

EXAMPLE I

In order to demonstrate the excellent characteristics of iron carbide produced in accordance with the present invention a system, as illustrated in FIG. 1, was used to prepare iron carbide fines and briquettes. Table I below sets forth the total iron, metallized iron, percent metallization, percent carbon and density for a number of samples prepared in accordance with the present invention.

TABLE I

Example of Iron Carbide Production
(Temp. Range in the Metallizing-Carburizing Reactor 650–790° C.)

| Product | % Fe tot. | % Fe met. | % Metalliz. | % C | gr/cm³ |
|---|---|---|---|---|---|
| Fines (Lab) | 88.93 | 85.54 | 96.19 | 6.38 | — |
| | 90.36 | 84.95 | 94.01 | 4.22 | — |
| | 90.46 | 84.89 | 93.84 | 3.97 | — |
| | 91.28 | 87.03 | 95.34 | 3.88 | — |
| | 91.14 | 86.93 | 95.38 | 3.79 | — |

TABLE I-continued

Example of Iron Carbide Production
(Temp. Range in the Metallizing-Carburizing Reactor 650–790° C.)

| Product | % Fe tot. | % Fe met. | % Metalliz. | % C | gr/cm³ |
|---|---|---|---|---|---|
| Briquettes | 90.56 | 85.26 | 94.15 | 3.98 | 4.26–4.60 |
| | 91.01 | 84.85 | 93.23 | 3.88 | 4.45–4.71 |
| | 90.69 | 83.40 | 91.96 | 3.54 | 4.85–5.11 |

As shown, each sample prepared in accordance with the present invention has excellent characteristics for use as starting material in steel-making processes.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

We claim:

1. A process for conversion of iron oxide to iron carbide, comprising the steps of:

providing a fluidized bed reactor having a metallizing zone and a carburizing zone;

feeding iron oxide to said reactor;

feeding a reducing gas to said reactor so as to provide reduced iron in said metallizing zone; and feeding a carburizing gas to said carburizing zone wherein said reducing gas and said carburizing gas are fed to said reactor so as to provide a ratio $(CH_4+CO)/CO_2$ of between about 9 and about 33 so as to provide a final iron carbide product in said carburizing zone having between about 2.2% wt. and about 6,5 wt. % carbon and at least about 91% wt. iron.

2. A process according to claim 1, further comprising the step of forming briquettes of said iron carbide product.

3. A process according to claim 1, wherein said feeding iron oxide step comprises feeding oxide fines containing iron to said reactor.

4. A process according to claim 3, wherein said oxide fines have a particle size of between about 18.6%+16 mesh and about 57.22%–100 mesh.

5. A process according to claim 1, wherein said reducing gas has a dry basis composition, by volume, of between about 58% and about 66% hydrogen, between about 5% and about 9% carbon monoxide, between about 1% and about 4% carbon dioxide, and between about 24% and about 33% methane, nitrogen balance.

6. A process according to claim 1, wherein said reducing gas is fed to said reactor at a temperature of between about 650° C. and about 850° C.

7. A process according to claim 1, wherein said reducing gas is fed to said reactor at a temperature of between about 660° C. and about 760° C.

8. A process according to claim 1, wherein said carburizing gas is fed to said carburizing zone at a temperature of between about 598° C. and about 790° C.

9. A process according to claim 1, wherein said carburizing gas is methane.

10. A process according to claim 1, wherein said reactor is operated at a pressure of between about 10 and about 20 bars.

11. A process according to claim 1, wherein said providing step comprises providing said fluidized reactor having a pre-heating zone, said metallizing zone and said carburizing zone, and wherein said iron oxide is fed to said preheating zone for heating to a temperature of between about 720° C. and about 840° C.

12. A process according to claim 11, wherein pre-heated iron oxide exits said pre-heating zone and enters said metallizing zone, and wherein metallized iron exits said metallizing zone and enters said carburizing zone.

13. A process according to claim 12, wherein said fluidized bed reactor comprises a plurality of reactors including a first reactor defining said pre-heating zone, at least one second reactor defining portions of said metallizing zone, and a third reactor defining a final portion of said metallizing zone and defining said carburizing zone.

14. A process according to claim 13, wherein partially metallized material is fed from said second reactor to said third reactor having a degree of metallization of between about 10% and about 78% wt.

15. A process according to claim 13, wherein partially metallized material is fed from said second reactor to said third reactor having a degree of metallization of about 75%.

16. A process according to claim 1, wherein said final iron carbide product comprises iron carbide particles having a shell of ferrite material.

17. A process according to claim 16, further comprising the step of briquetting said iron carbide particles so as to provide iron carbide briquettes wherein said ferrite material binds said particles together.

18. A process according to claim 16, further comprising the step of subjecting said iron carbide particles to a flow of inert gas whereby an amount of said ferrite material in said shell can be controlled.

19. A process according to claim 1, wherein said reducing gas and said carburizing gas are fed to said reactor so as to provide a superficial gas velocity in said reactor of between about 3.2 ft/sec and about 4.5 ft/sec.

20. A process for conversion of iron oxide to iron carbide, comprising the steps of:

providing a fluidized bed reactor having a metallizing zone and a carburizing zone;

feeding iron oxide to said reactor;

feeding a reducing gas to said reactor so as to provide reduced iron in said metallizing zone; and feeding a carburizing gas to said carburizing zone so as to provide a final iron carbide product in said carburizing zone having between about 2.2% wt. and about 6.5 wt. % carbon and at least about 80% wt. iron wherein said iron carbide product is characterized iron carbide particles having a shell of ferrite material.

21. A process according to claim 20, further comprising the step of briquetting said iron carbide particles so as to provide iron carbide briquettes wherein said ferrite material binds said particles together.

22. A process according to claim 20, further comprising the step of subjecting said iron carbide particles to a flow of inert gas whereby an amount of said ferrite material in said shell can be controlled.

* * * * *

UNITED STATES PATENT AND TRADEMARK OFFICE
CERTIFICATE OF CORRECTION

PATENT NO.   : 6,063,155
DATED        : May 16, 2000
INVENTOR(S)  : Emilio Quero Masso et al.

Page 1 of 1

It is certified that error appears in the above-identified patent and that said Letters Patent is hereby corrected as shown below:

Column 6,
Line 36, change "6,5" to read --6.5--.

Signed and Sealed this

Thirty-first Day of July, 2001

Attest:

NICHOLAS P. GODICI
Attesting Officer
Acting Director of the United States Patent and Trademark Office